(12) United States Patent
Liau

(10) Patent No.: US 12,187,222 B2
(45) Date of Patent: Jan. 7, 2025

(54) IMPROPER SEATBELT USAGE DETECTION

(71) Applicant: Tesla, Inc., Austin, TX (US)

(72) Inventor: Forrest Wen Liau, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/131,316

(22) Filed: Apr. 5, 2023

(65) Prior Publication Data

US 2023/0242070 A1 Aug. 3, 2023

Related U.S. Application Data

(63) Continuation of application No. 17/146,281, filed on Jan. 11, 2021, now Pat. No. 11,661,028, which is a
(Continued)

(51) Int. Cl.
*B60N 2/02* (2006.01)
*B60R 21/015* (2006.01)
(Continued)

(52) U.S. Cl.
CPC ........ *B60R 22/48* (2013.01); *B60R 21/01532* (2014.10); *B60N 2/002* (2013.01);
(Continued)

(58) Field of Classification Search
CPC .... B60R 2022/4808; B60R 2022/4816; B60R 2022/4825; B60R 2022/4833;
(Continued)

(56) References Cited

U.S. PATENT DOCUMENTS

| 6,439,333 B2 | 8/2002 | Dömens et al. |
| 7,576,642 B2 | 8/2009 | Rodemer |

(Continued)

FOREIGN PATENT DOCUMENTS

| DE | 102016014858 | 6/2018 | |
| DE | 102016014858 A1 * | 6/2018 | ............. B60N 2/002 |

OTHER PUBLICATIONS

"U.S. Appl. No. 17/146,281, Preliminary Amendment filed Jun. 25, 2021", 3 pgs.
(Continued)

*Primary Examiner* — Syed A Islam
(74) *Attorney, Agent, or Firm* — Schwegman Lundberg & Woessner, P.A.

(57) ABSTRACT

A system for detecting improper usage of a seatbelt of a vehicle includes a vehicle seat having a seat cushion and a seat back. A shoulder belt and a lap belt are intended to restrain an occupant sitting on the vehicle seat. The system includes a sensor module associated with the shoulder belt and the lap belt. The sensor module generates signals indicative of at least one parameter associated with the vehicle seat, the shoulder belt, and the lap belt when the occupant is sitting on the vehicle seat. The system also includes a controller that receives the signals indicative of the at least one parameter associated with the seat back, the shoulder belt, and the lap belt. The controller analyzes the received one or more signals, and determines whether the seatbelt is being used improperly by the occupant, based on the analysis.

18 Claims, 9 Drawing Sheets

Related U.S. Application Data continuation of application No. 16/209,227, filed on Dec. 4, 2018, now Pat. No. 10,889,262.

(60) Provisional application No. 62/595,257, filed on Dec. 6, 2017.

(51) Int. Cl.
  *B60R 22/48* (2006.01)
  *B60N 2/00* (2006.01)

(52) U.S. Cl.
  CPC ......... *B60R 2022/4808* (2013.01); *B60R 2022/4825* (2013.01); *B60R 2022/4833* (2013.01); *B60R 2022/4841* (2013.01); *B60R 2022/485* (2013.01); *B60R 2022/4858* (2013.01); *B60R 2022/4866* (2013.01); *B60R 2022/4875* (2013.01); *B60R 2022/4883* (2013.01); *B60R 2022/4891* (2013.01)

(58) Field of Classification Search
  CPC ...... B60R 2022/4841; B60R 2022/485; B60R 2022/4858; B60R 2022/4866; B60R 2022/4875; B60R 2022/4883; B60R 2022/4891; B60R 22/48; B60N 2/002
  See application file for complete search history.

(56) References Cited

U.S. PATENT DOCUMENTS

| | | | |
|---|---|---|---|
| 7,819,003 | B2 | 10/2010 | Breed et al. |
| 8,410,945 | B2 | 4/2013 | Breed |
| 9,102,220 | B2 | 8/2015 | Breed |
| 10,328,888 | B2 | 6/2019 | Pline |
| 10,549,716 | B2* | 2/2020 | Moenkemoeller ..... G01V 3/088 |
| 10,889,262 | B2 | 1/2021 | Liau |
| 11,661,028 | B2 | 5/2023 | Liau |
| 2001/0019272 | A1 | 9/2001 | Eisenmann et al. |
| 2012/0053793 | A1* | 3/2012 | Sala ............... B60N 2/0244 |
| | | | 701/45 |
| 2012/0086249 | A1* | 4/2012 | Hotary ............... B60N 2/505 |
| | | | 297/284.3 |
| 2016/0200220 | A1 | 7/2016 | Sugiyama |
| 2018/0178690 | A1* | 6/2018 | Castillo ............... B60N 2/002 |
| 2018/0208151 | A1 | 7/2018 | Jimenez Hernandez et al. |
| 2019/0054841 | A1* | 2/2019 | Cech ............... B60N 2/2887 |
| 2019/0168710 | A1 | 6/2019 | Liau |
| 2021/0309180 | A1 | 10/2021 | Liau |

OTHER PUBLICATIONS

"U.S. Appl. No. 17/146,281, Non Final Office Action mailed Oct. 12, 2021", 6 pgs.

"U.S. Appl. No. 17/146,281, Examiner Interview Summary mailed Jan. 25, 2022", 2 pgs.

"U.S. Appl. No. 17/146,281, Response filed Apr. 12, 2022 to Non Final Office Action mailed Oct. 12, 2021", 11 pgs.

"U.S. Appl. No. 17/146,281, Final Office Action mailed Jul. 19, 2022", 9 pgs.

"U.S. Appl. No. 17/146,281, Response filed Dec. 19, 2022 to Final Office Action mailed Jul. 19, 2022", 11 pgs.

"U.S. Appl. No. 17/146,281, Notice of Allowance mailed Feb. 8, 2023", 7 pgs.

"U.S. Appl. No. 17/146,281, 312 Amendment filed Apr. 5, 2023", 8 pgs.

"U.S. Appl. No. 17/146,281, PTO Response to Rule 312 Communication mailed Apr. 28, 2023", 3 pgs.

"U.S. Appl. No. 16/209,227, Non Final Office Action mailed Mar. 19, 2020", 8 pgs.

"U.S. App. No. 16/209,227, Response filed Aug. 19, 2020 to Non Final Office Action mailed Mar. 19, 2020", 12 pgs.

"U.S. Appl. No. 16/209,227, Examiner Interview Summary mailed Aug. 25, 2020", 3 pgs.

"U.S. Appl. No. 16/209,227, Notice of Allowance mailed Sep. 10, 2020", 5 pgs.

* cited by examiner

IMPROPER SEATBELT USAGE DETECTION

CROSS-REFERENCE TO RELATED APPLICATION

The present U.S. Utility Patent Application is a continuation of U.S. Utility patent application Ser. No. 17/146,281, entitled "Seatbelt Usage Detection", filed Jan. 11, 2021, which is a continuation of and claims priority to U.S. Utility patent application Ser. No. 16/209,227, entitled "Improper Seatbelt Usage Detection", filed Dec. 4, 2018, which claims priority pursuant to 35 U.S.C. 119(e) to U.S. Provisional Application No. 62/595,257, entitled "Improper Seatbelt Usage Detection", filed Dec. 6, 2017, each of which is hereby incorporated herein by reference in its entirety and made part of the present U.S. Utility Patent Application for all purposes.

TECHNICAL FIELD

The present disclosure relates to seatbelt systems in vehicles. More specifically, the present disclosure relates to detection of improper usage of seatbelt in vehicles.

BACKGROUND

It is well known that properly-worn seatbelts save lives during vehicle accidents. A seatbelt system typically comprises a retractor, D-ring or belt guide, a buckle and associated tongue, lower belt restraint anchor and seatbelt webbing, Generally, the seatbelt webbing (or seatbelt) is divided into a lap (belt) portion and a shoulder (belt) portion. Seatbelt for occupants on a vehicle's side typically include a shoulder belt intended to be worn across the occupant's upper torso and a lap belt intended to be worn across the lap. For safety-belt systems to be effective, seatbelts must be worn as intended. However, occupants do not always wear the seatbelts as indented. For example, occupants have been observed wearing the shoulder belt portion belt behind their backs, the shoulder belt portion under their arms, or hold another occupant on their lap. Current monitoring systems cannot determine whether an occupant is properly using a seatbelt. Thus, there is a need for a system that detects improper use of seatbelt.

SUMMARY

The present disclosure provides a restraint system to detect improper usage of seatbelt.

The restraint system includes a seatbelt, typically with a shoulder belt portion and a lap belt portion. The system includes a sensor module to ensure proper seatbelt use. In certain embodiments, the sensor module includes sensors embedded within the seat itself (for example in the seat trim), or uses the seat as part of the sensor, to determine if a seatbelt is worn properly. In embodiments, the sensor module includes one or more sensors, such as inertial sensors or radio-frequency (RF) beacons, in the seatbelt. The system also includes a controller to control that receives signals from the sensors and determines improper seatbelt usage.

In embodiments, sensor module includes a capacitance sensor formed between the seatbelt, such as the shoulder belt or lap belt, and seat, for example, the seat back. The sensor module may measure the mutual capacitance between the seat back and seatbelt. In other embodiments, the sensor module may measure the self capacitance of the seatbelt. In embodiments, the sensor module includes inertial sensors, which generate signals that the controller uses to determine shape and orientation of shoulder belt and lap belt to determine any improper seatbelt usage.

Embodiments of the present disclosure and their advantages are best understood by referring to the detailed description that follows. The description herein are for purposes of illustrating embodiments of the present disclosure and not for purposes of limiting it.

DETAILED DESCRIPTION

Figure 1:
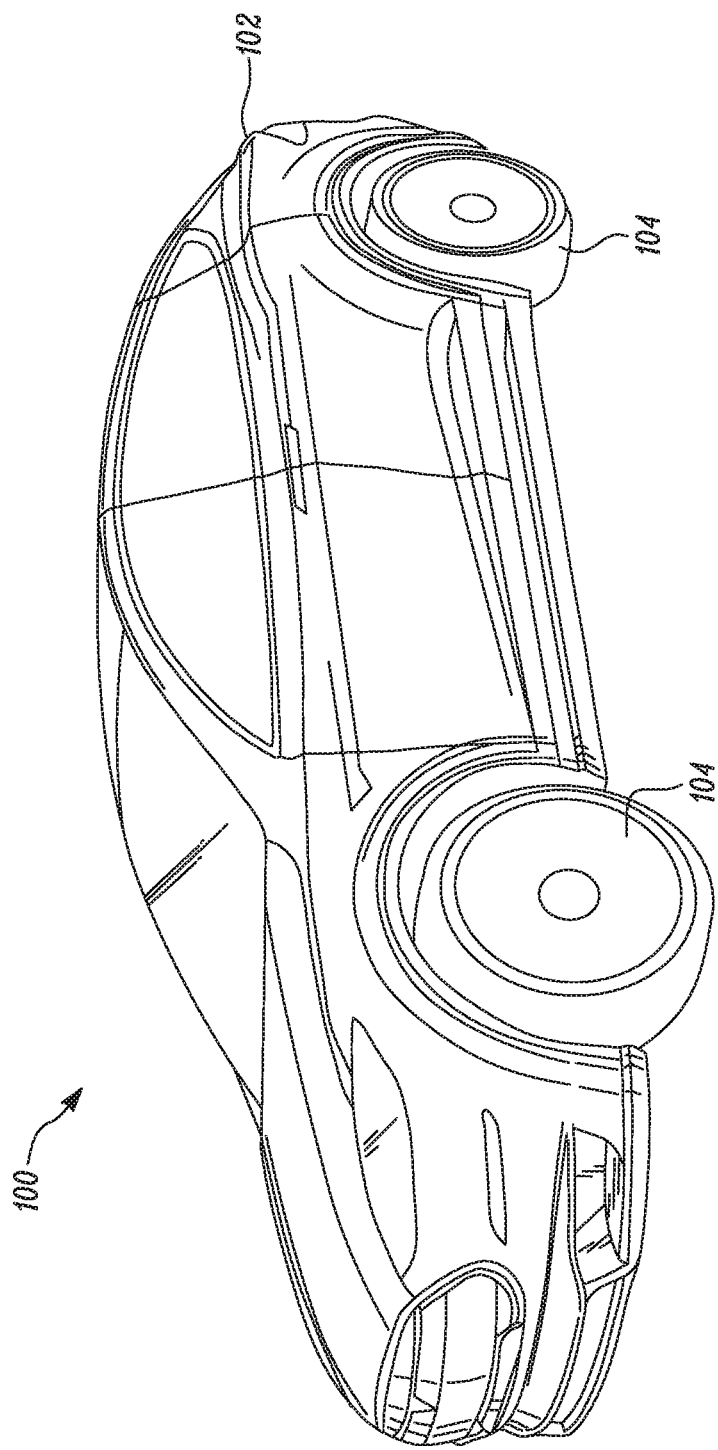
FIG. 1 illustrates an exemplary vehicle according to certain embodiments of the invention.

FIG. 1 illustrates an exemplary vehicle 100. Vehicle 100 may be a passenger car, truck, sport utility vehicle, or van. Vehicle 100 includes a frame 102 that is supported by a set of wheels 104. Vehicle 100 includes a power source (not shown) configured to propel vehicle 100. Vehicle 100 may be a manually driven vehicle, a semi-autonomous vehicle, or an autonomous vehicle. Vehicle 100 may include any suitable arrangement of vehicle seats 106 (shown in FIG. 2 onwards) inside vehicle 100 to accommodate passengers. For example, vehicle 100 may include two rows of vehicle seats having driver seat in front. Another exemplary arrangement is provided in FIG. 2. It should be understood that vehicle 100 may include various other essential and non-essential components which are not being discussed in context of present disclosure, as present disclosure is not limited by any such components in any manner.

Figure 2:
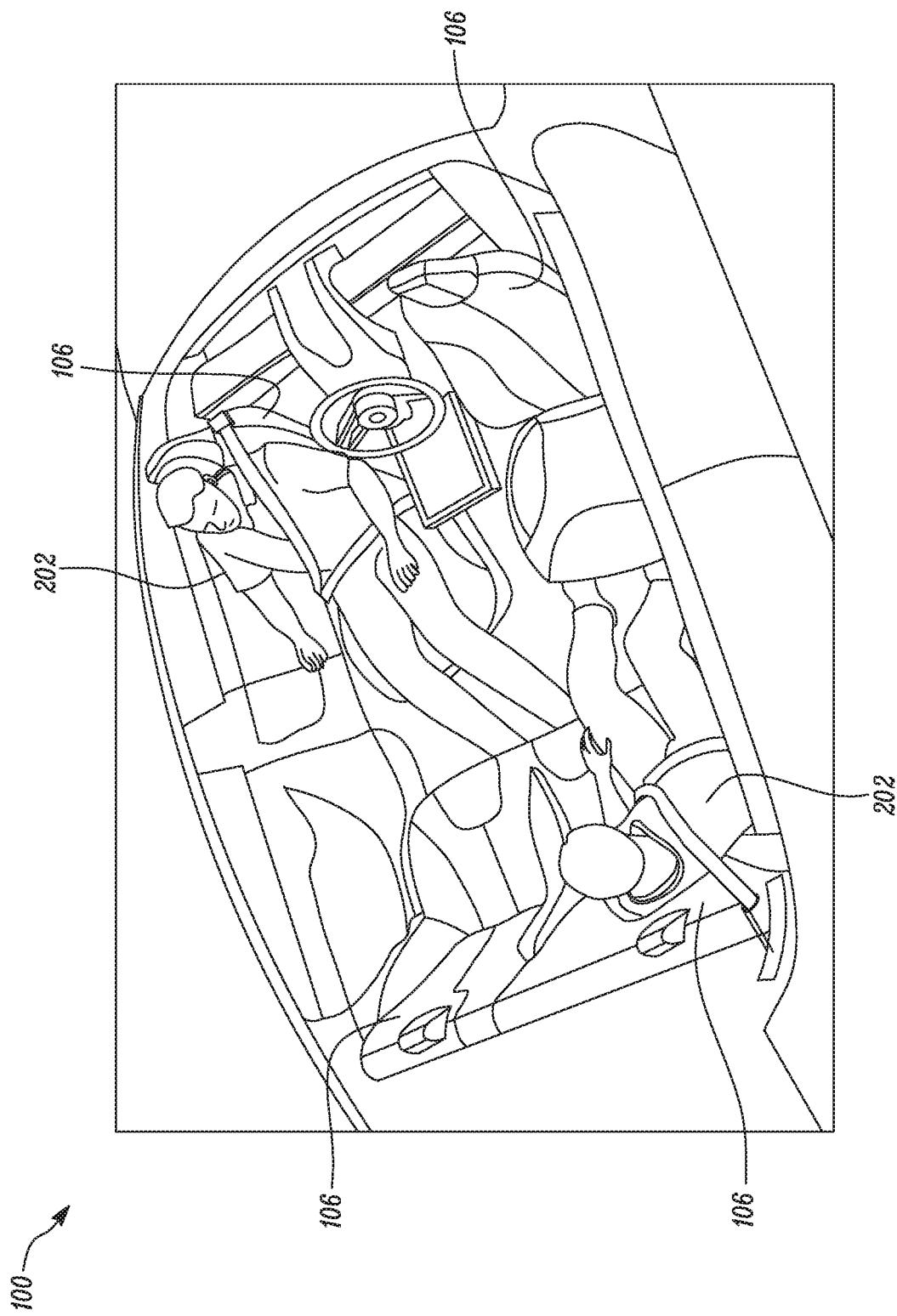
FIG. 2 illustrates the interior of the exemplary vehicle shown in FIG. 1, according to certain embodiments of the invention.

FIG. 2 shows vehicle 100 as an autonomously driven vehicle having vehicle seats 106 provided such that occupants 202 sitting on vehicle seats 106 face each other. In embodiments, vehicle 100 is not autonomously driven. Vehicle 100 includes safety systems for ensuring safety of occupants 202 while riding in vehicle 100 in case of an unwanted event such as a crash, a sudden acceleration, or deceleration etc. One of such system is a seatbelt system. Seatbelt system includes seatbelts associated with each of vehicle seats 106 to ensure occupants 202 are seated on vehicle seats 106 in case of an unwanted event.

Figure 3:
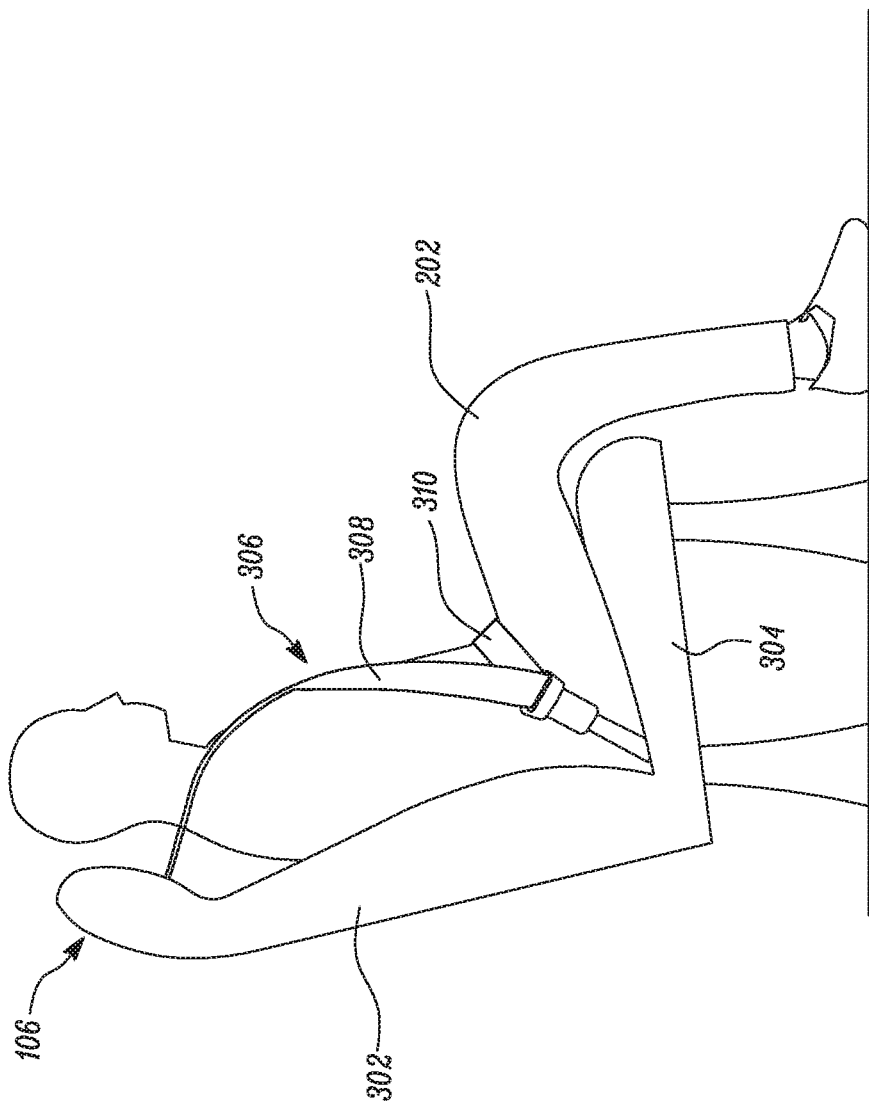
FIG. 3 illustrates an occupant sitting on a vehicle seat showing proper usage of seatbelt, according to certain embodiments of the invention.

FIG. 3 schematically shows occupant 202 sitting on vehicle seat 106. Vehicle seat 106 includes a seat back 302 and a seat cushion 304. A seatbelt 306 is provided to ensure safety of occupant 202 sitting on vehicle seat 106. Seatbelt 306 includes a shoulder belt 308 and a lap belt 310. Shoulder belt 308 and lap belt 310 together restrain occupant 202 sitting on vehicle seat 106. Shoulder belt 308 is intended to pass over the shoulder of occupant 202, and lap belt 310 is intended to pass over the lap of occupant 202, and is an example of a proper wearing of the seatbelt. When properly used, seatbelt 306 restrains occupant 202 sitting on vehicle seat 106 and ensures safety of occupant 202. It should be understood that seatbelt system may include various other structural components such as a retractor, D-ring or belt guide, a buckle and associated tongue, lower belt restraint anchor etc., which are not being discussed in context of present disclosure, as present disclosure is not limited by any such components in any manner. In certain embodiments, may involve a one-piece seat without a clearly defined cushion and back portion, similar to a hammock. A person of skill will understand that the cushion portion to refer to the region where an occupant's buttocks and/or upper legs are intended to contact the seat. A person of skill in the art would similarly understand that the inventions described herein could be applied to future belt concepts that do not have a lap belt, for example, a three-point restraint system or a restraint system similar to a roller coaster top-down restraint system. In such restraint systems, a person of skill would understand that the restraint or restraint belt may contain sensors or be part of a sensing system in the same manner as described herein for the lap belt and shoulder belt.

Figure 4:
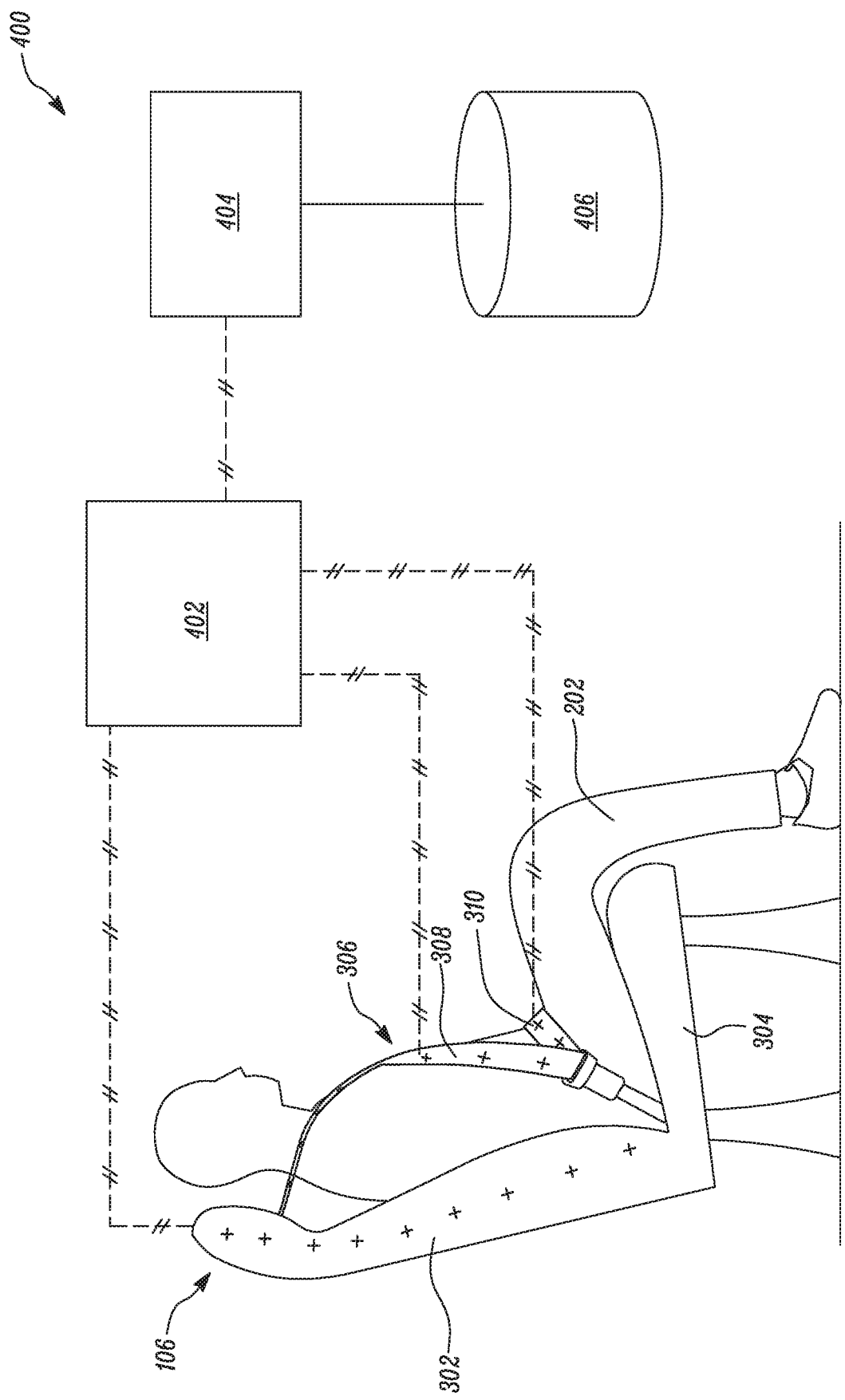
FIG. 4 shows a system to detect improper usage of seatbelt by occupant sitting on vehicle seat, according to certain embodiments of the invention.

FIG. 4 illustrates a system 400 to detect improper usage of seatbelt 306 according to certain embodiments. System 400 includes vehicle seat 106 having seat back 302 and seat cushion 304. System 400 includes seatbelt 306 having shoulder belt 308 and lap belt 310. System 400 further includes a sensor module 402 associated with vehicle seat 106, shoulder belt 308 and lap belt 310. Sensor module 402 may be a single sensor, or a group of multiple sensors. Sensor module 402 may be configured to generate signals indicative of at least one parameter associated with vehicle seat 106, shoulder belt 308, and lap belt 310 while occupant 202 is sitting on vehicle seat 106. Sensor module 402 may be found within seatbelt 306, seat back 302, and seat cushion 304 and is shown with crosshatched lines (//) to so indicate. The crosshatching between sensor module 402 and controller 404 indicates that the connection between the two may be wired, wireless, or via another connection method. The two may also be integrated together.

System 400 further includes a controller 404. Controller 404 may be a single controller, or multiple controllers grouped together, a microprocessor, field programmable gate array (FPGA), or any other such device which may be configured to perform all desired functions of controller 404. Controller 404 includes an associated memory 406. Memory 406 may store data regarding usage of vehicle 100, occupant profiles of occupants 202 which use vehicle 100 such as, but not limited to, information about weight, height, posture of occupants 202 etc. Memory 406 may also store any other such information which may be suitable for use with various aspects of present disclosure. Controller 404 receive signals generated by sensor module 402, and analyzes received signals. Controller 404 determines whether seatbelt 306 is being used improperly based on analysis of signals. In certain embodiments, the mutual capacitance between the seat back and the shoulder belt 308 is determined. In other embodiments, the mutual capacitance between the seat cushion and the shoulder belt 308 is determined. Controller 404 may determine, or otherwise use, a range of acceptable capacitance values, indicative of proper seatbelt usage, and/or a range of values indicating improper seatbelt usage. Controller 404 may determine proper or improper seatbelt usage for both the shoulder belt and lap belt jointly or independently.

Figure 5:
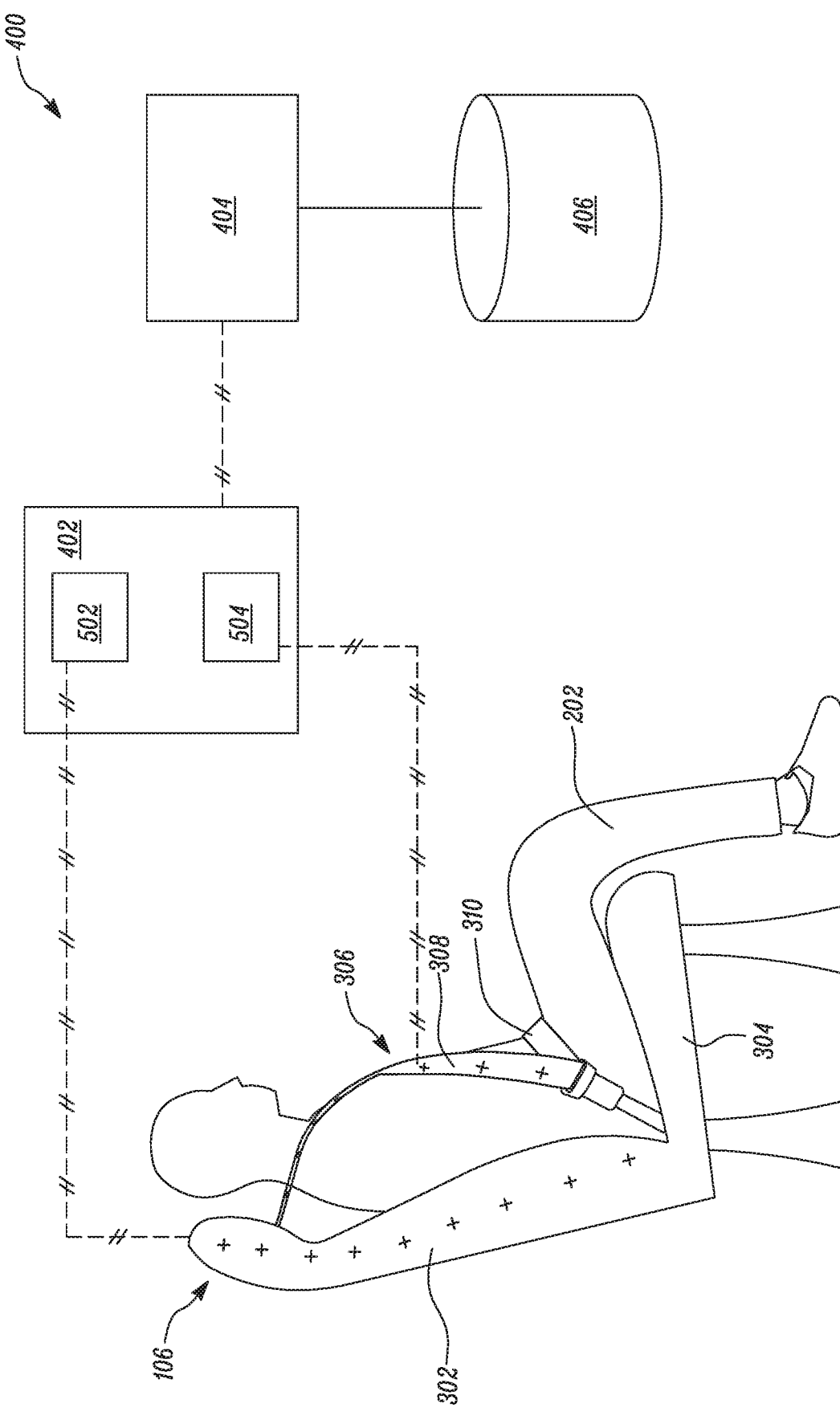
FIG. 5 shows an exemplary embodiment of system to detect improper usage of seatbelt, according to certain embodiments of the invention.

FIG. 5 shows another aspect of the present disclosure, according to certain embodiments. Sensor module 402 includes a first capacitance sensor 502, and a second capacitance sensor 504. The first capacitance sensor 502 and second capacitance sensor 504 may form a single sensor in which mutual capacitance is determined. Capacitance sensor may be any type of a sensor, or part thereof. In embodiments, the first capacitance sensor 502 is integrated into the seat back 302, such as in the trim of the seat back. First capacitance sensor 502 may be integrated with a fabric of seat back 302, or may be provided in form of conductive fibers or yarns embedded within seat back 302. Second capacitance sensor 504 may be integrated with a fabric of shoulder belt 308, or may be provided in form of conductive fibers or yarns embedded with shoulder belt 308. Together, the first capacitance sensor 502 and the second capacitance sensor 504 are used to measure the mutual capacitance between the seat back 302 and shoulder belt 308, which will be different depending on whether the occupant 202 is sitting on vehicle seat 106 and properly using the seatbelt 306 or not. Alternatively, the first capacitance sensor 502 or second capacitive sensor may measure self capacitance, which similarly provides different measurements depending on whether an occupant is seated on the vehicle seat 106 and seatbelt 306 is used properly or not. Controller 404 is configured to receive first signal and second signal. Controller 404 may include suitable communication hardware components such as transmitter, receiver, or transceiver etc. to receive signals.

Controller 404 receives signals from sensor module 402 and analyzes them to determine if a seatbelt is properly installed. In certain embodiments, the mutual capacitance between the seat back and the shoulder belt 308 is determined. In other embodiments, the mutual capacitance between the seat cushion and the shoulder belt 308 is determined. Controller 404 may determine, or otherwise use, a range of acceptable capacitance values, indicative of proper seatbelt usage, and/or a range of values indicating improper seatbelt usage. Controller 404 may determine proper or improper seatbelt usage for both the shoulder belt and lap belt jointly or independently. In another embodiment, the controller may compare mutual capacitance value from the mutual capacitance of the shoulder belt 308 and the seat back 302 to the mutual capacitance of the lap belt 310 to the seat cushion 304 to determine if the occupant is properly using the seat belt.

In certain embodiment, controller 404 may have a threshold value of the mutual capacitance stored in associated memory 406. Controller 404 may compare the calculated mutual capacitance to this stored threshold value. When seatbelt 306 is used properly, the measured capacitance is lower than (or above in certain embodiments) the threshold value. If the measured capacitance fails this comparison, then controller 404 may determine improper seatbelt usage, which may result in a warning. Repeated warnings may cause the disabling of driving (for example, when the vehicle is autonomously driven). Threshold values may be pre-stored in memory 406 based on one or more occupant profiles of occupants 202 of vehicle 100. In certain embodiments, the threshold values may be ratios of measured capacitance. In other embodiments, the measured capacitance profile is compared to stored reference profiles in associated memory 406 established by machine learning to determine a most probable state of seatbelt usage.

Figure 6:
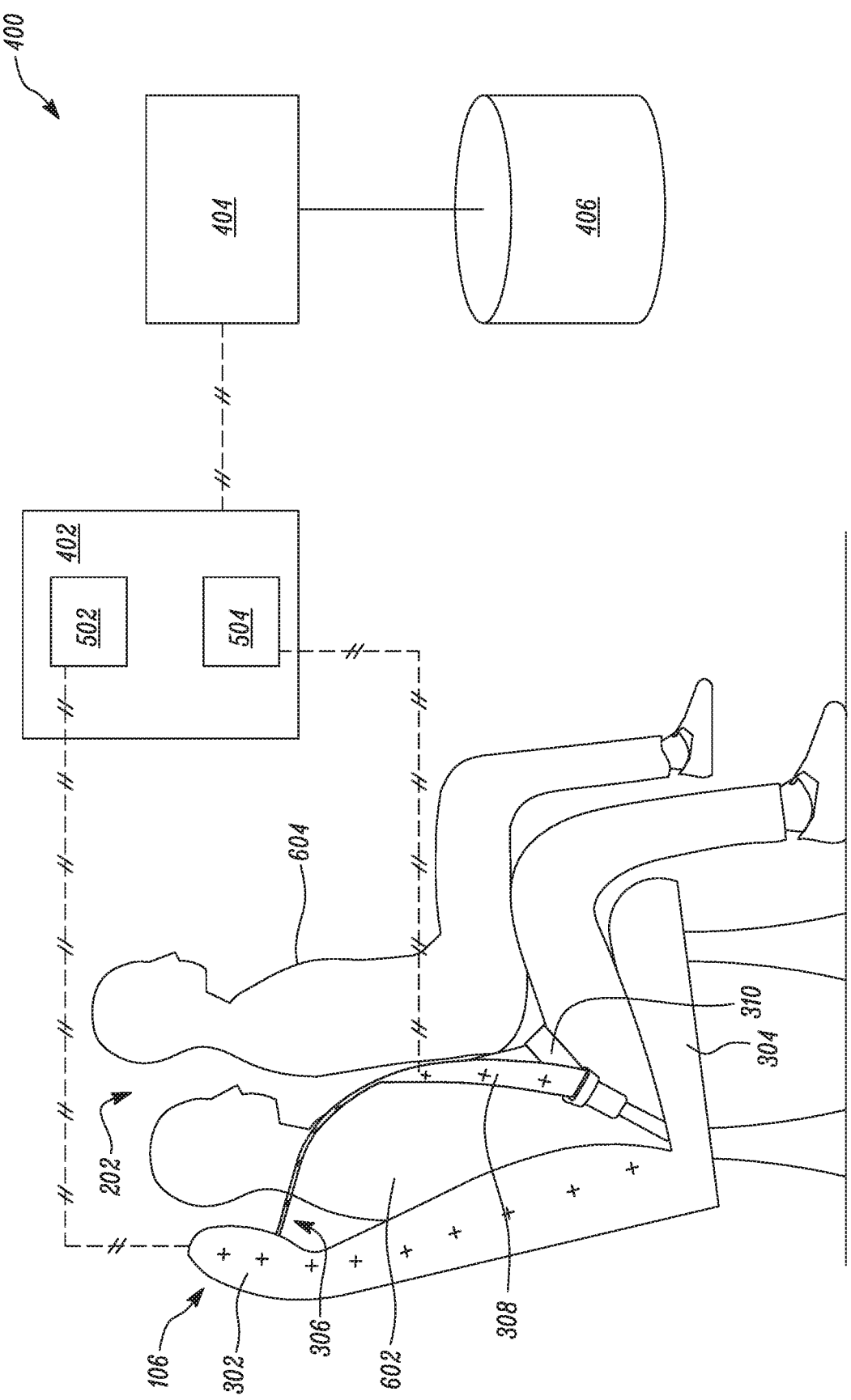
FIG. 6 shows an example of improper usage of seatbelt, and detection of the same, according to certain embodiments of the invention.

FIG. 6 shows an exemplary scenario of improper usage of seatbelt 306 that may be determined according to the present disclosure. Two occupants 202 are illustrated. A first occupant 602 is sitting on vehicle seat 106, and is wearing seatbelt 306. A second occupant 604 is illustrated as sitting on lap of first occupant 602, and is not wearing seatbelt 306. The present disclosure detects improper usage of seatbelt 306 in such a scenario. First capacitance sensor 502 measures self capacitance at the seat back 302, and second capacitance sensor 504 measures capacitance at shoulder belt 308. Capacitance measured by first capacitance sensor 502 provides measurement according to one body i.e. only for first occupant 602. Capacitance measured by second capacitance sensor 504 provides measurement according to two bodies i.e. both first occupant 602 and second occupant 604. Controller 404 receives signals from the measurements and analyzes the signals to determine whether multiple occupants 202 are present and thus improperly using seatbelt 306. In other embodiments, sensor module 402 uses the mutual capacitance between the seat and the seatbelt 306 and the self capacitance of either the seat or seatbelt to determine improper seatbelt usage.

Figure 7:
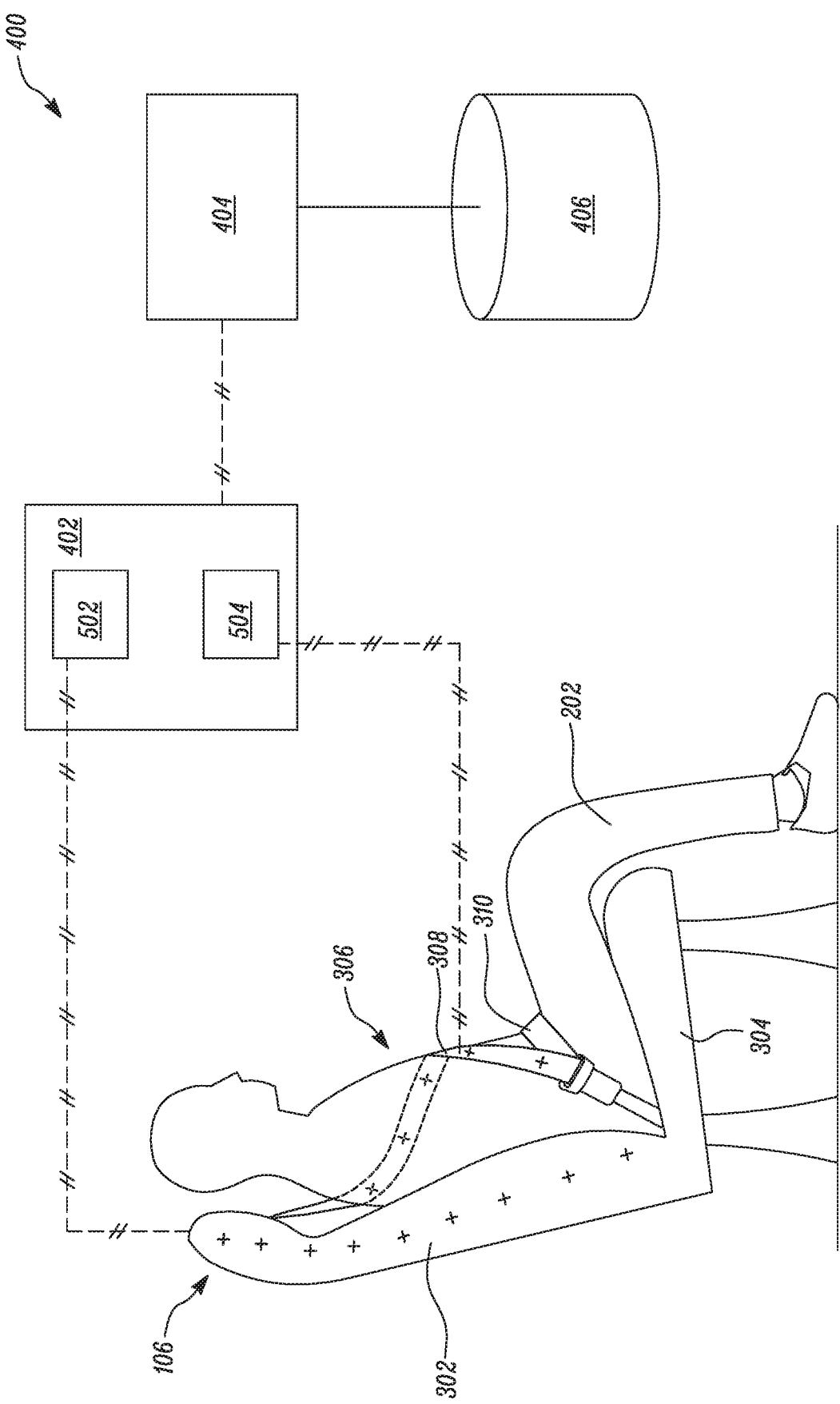
FIG. 7 shows another example of improper usage of seatbelt, and detection of the same, according to certain embodiments of the invention.

FIG. 7 shows another exemplary scenario of improper seatbelt usage when occupant 202 has placed shoulder belt 308 under his arm instead of placing shoulder belt 308 above his shoulder. In this case, first capacitance sensor 502 located within seat back 302 and second capacitance sensor 504 located within shoulder belt 308 sense capacitive interaction between seat back 302 and shoulder belt 308. Seat back 302 and shoulder belt 308 may also be equipped with wireless communication components, such that controller 404 may detect when they are coming closer than a threshold distance to each other. Controller 404 receives signals from both first capacitance sensor 502 and second capacitance sensor 504, and determines improper usage of seatbelt 306 based on detected capacitive interaction between first capacitance sensor 502 and second capacitance sensor 504. In certain embodiments, sensor module 402 emits a wireless signal through capacitance sensor 502 and controller 404 receives signals from capacitance sensor 504. In other embodiments, sensor module 402 emits a wireless signal through capacitance sensor 504 and controller 404 receives signals from capacitance sensor 502. Other improper seatbelt usage includes the occupant placing shoulder belt behind the occupant's body, a belt bypass system in which the seatbelt is clipped in an extended position, latching the seatbelt, but sitting on top of it, a child sitting with a lap belt that hits the child around the neck because the child is not sitting on a booster seat, or an occupant has fake visual belt, such as a stripe across the occupant's shirt that can bypass a machine vision camera safety system looking for a belt. These cases can be similarly determined using the capacitance measurements in similar manners.

Figure 8:
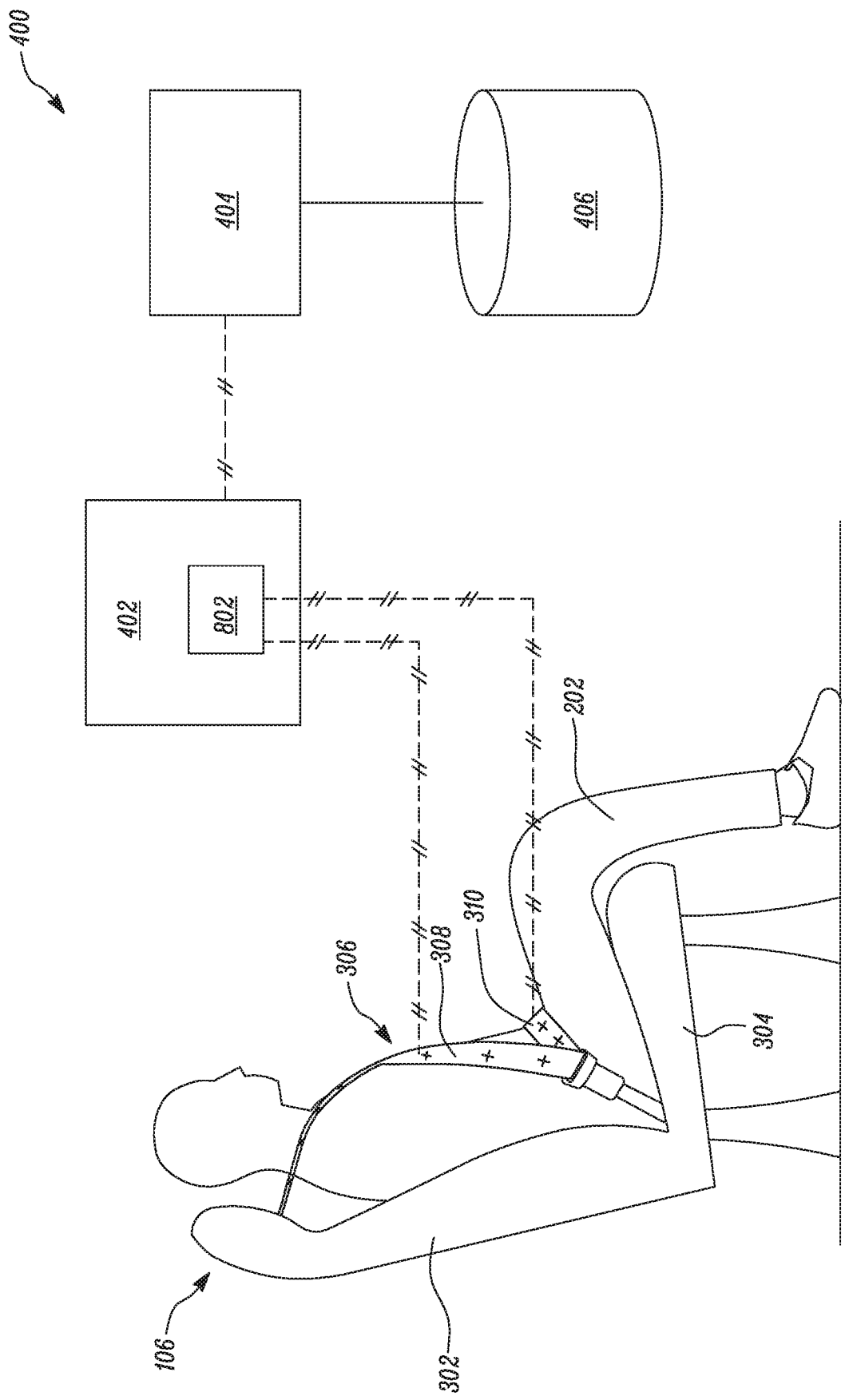
FIG. 8 shows another exemplary embodiment of system to detect improper usage of seatbelt, according to certain embodiments of the invention.

FIG. 8 shows yet another aspect of present disclosure. Sensor module 402 includes an inertial sensor 802. Inertial sensor 802 is integrated with shoulder belt 308 and lap belt 310. Inertial sensors generate signals that controller 404 uses to determine spatial orientation of shoulder belt 308 and lap belt 310. Inertial sensor 802 may be an accelerometer, a gyroscope, or any other type of a device which may be used to measure spatial orientation. Controller 404 receives signals generated by inertial sensor 802 and determines an orientation profile of shoulder belt 308 and lap belt 310 based on received signals. Orientation profile may refer to any type of an orientation or mapping system that describes the three-dimensional orientation of the shoulder belt 308 and/or lap belt 310. This orientation may include the orientation of the shoulder belt 308 and lap belt 310 relative to vehicle seat 106 and occupant 202 sitting on vehicle seat 106. In certain embodiments, controller 404 compares the determined orientation or mapping compared to a pre-stored orientation profile of the shoulder belt 308 or as lap belt 310 to determine whether seatbelt 306 is being used properly. Controller 404 may compare a determined orientation profile (or range of orientations) with pre-stored orientation profile. The comparison may include a range of acceptable orientation angles at for heights above the seat cushion 304 or other reference point. In certain embodiments, controller 404 may compare signals received from inertial sensor 802 to signal received from another inertial sensor in vehicle 100 to account for vehicle movement affecting inertial sensor 802.

Figure 9:
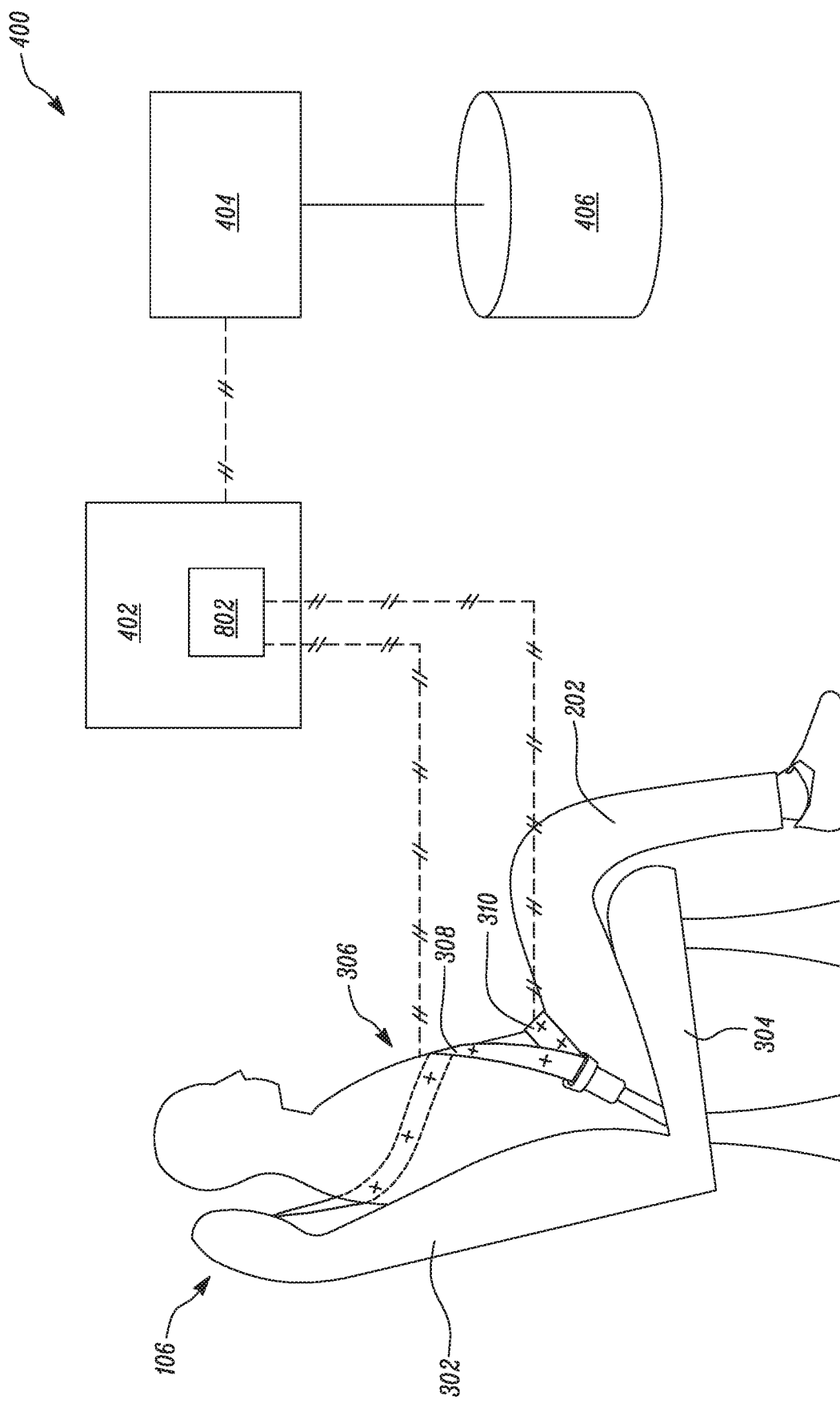
FIG. 9 shows an example of improper usage of seatbelt, and detection of the same, according to certain embodiments of the invention.

For example, FIG. 9 shows an exemplary scenario when occupant 202 has placed shoulder belt 308 under his arm instead of placing shoulder belt 308 above shoulder. In this case, inertial sensor module 802 integrated with shoulder belt 308 and lap belt 310 generates signals that controller 404 uses to determine the spatial orientation of shoulder belt 308 and lap belt 310. Controller 404 then compares the determined orientation of shoulder belt 308 and lap belt 310 to pre-stored orientation profiles of shoulder belt 308 and lap belt 310 respectively corresponding to proper usage of seatbelt 306. Alternatively, controller 404 may compare a determined orientation profile (or range of orientations) with pre-stored orientation profile. The comparison may include a range of acceptable orientation angles at for heights above the seat cushion 304 or other reference point. When the shoulder belt 308 passes under arm of occupant 202, the orientation profile of shoulder belt 308 will be different than the pre-stored orientation profile corresponding to proper usage of seatbelt 306. For example, when used properly, shoulder belt 308 may be almost horizontal near the occupant's shoulder, so excess tilt in that area may indicate shoulder belt 308 being tucked under one's arm or wrapping around the side of one's neck. Similarly, when properly used, lap belt 310 may be horizontal or around 45 degrees, with higher degrees of tilt indicating lap belt 310 is too high (going around abdomen) and no tilt at all indicating that the belt is under the occupant. Thus, controller 404 determines seatbelt 306 is being used improperly based on comparison between determined orientation profile and pre-stored orientation profile of shoulder belt 308 and lap belt 310. In other embodiments, an RF beacon, an infrared tag, or another sensor is used instead of, or in addition to, an inertial sensor, to determine improper seatbelt usage.

In other embodiments, an RF beacon is used instead of, or in addition to, an inertial sensor, to determine improper seatbelt usage. Other improper seatbelt usage includes the occupant placing the shoulder belt behind the occupant's body, a belt bypass system in which the seatbelt is clipped in an extended position, latching the seatbelt, but sitting on top of it, a child sitting with a lap belt that hits the child around the neck because the child is not sitting on a booster seat, or an occupant has fake visual belt, such as a stripe across the occupant's shirt. These cases can be similarly determined using the inertial or RF beacon measurements. In other embodiments, the inertial sensors (and/or RF beacons and/or infrared tags) and capacitance sensors are both present to determine improper seatbelt usage. In certain embodiments, controller 404 may classify the occupant or child seat using information received. In other embodiments, controller 404 determine the posture of the occupant using information received.

After determining improper usage of seatbelt 306, controller 404 may issue a warning, a notification, sound an alarm, or may even not allow to operate vehicle 100 until seatbelt 306 is used properly. A warning may be a text message displayed on display system of vehicle infotainment system, or an alarm sounding on vehicle infotainment system, a text message to registered mobile number of occupant, etc. Controller 404 may perform any other type of follow up actions as well to ensure proper usage of seatbelt 306 while driving vehicle 100. The present disclosure is not limited by any such follow up actions in any manner.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", comprising", "incorporating", "consisting of", "have", is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A system for characterizing operation of a vehicle, the system comprising:
    a seat;
    a belt to restrain an occupant sitting on the seat;
    a seat sensor module associated with the seat, wherein the seat sensor module is configured to generate one or more first signals indicative of at least one parameter associated with the seat;
    a belt sensor module associate with the belt, wherein the belt sensor module is configured to generate one or more second signals indicative of at least one parameter associated with the belt; and
    a controller configured to:
        store a plurality of occupant profiles, the plurality of occupant profiles comprising information related to a height, weight, or posture of the occupant;
        receive one or more signals indicative of the at least one parameter, wherein the one or more signals comprises the one or more first signals or the one or more second signals;
        analyze the received one or more signals, wherein the one or more signals are compared to a plurality of sets of threshold values, wherein an individual set of threshold values is associated with an individual occupant profile;
        match an occupant to an individual occupant profile of the plurality of occupant profiles based on the analysis of the received one or more signals; and
        characterize operation of the vehicle based on the individual occupant profile.

2. The system of claim 1 wherein the controller is further configured to determine a proper use of the seat or a proper use of the belt based on the individual occupant profile.

3. The system of claim 1 wherein the seat sensor module or the belt sensor module comprises a capacitance sensor.

4. The system of claim 1 wherein the controller is further configured to:
    compare a measured capacitance with a threshold value included in a set of threshold of values; and
    determine improper usage of the belt by the occupant if the measured capacitance exceeds the threshold value.

5. The system of claim 1, wherein the received signals form a measured capacitance profile which is analyzed via machine learning to determine a most probable state of seatbelt usage.

6. The system of claim 1, wherein the controller further analyzes an orientation profile based on an inertial sensor integrated with the seat.

7. A system for identifying an individual occupant profile, the system comprising:
    a vehicle seat;
    a sensor module associate with the vehicle seat, wherein the sensor module is configured to generate one or more first signals indicative of at least one parameter associated with the seat; and a controller configured to:
receive one or more first signals indicative of the at least one parameter;
analyze the received one or more first signals;
identify an individual occupant profile of a plurality of occupant profiles based on the analysis of the received one or more first signals, wherein the plurality of occupant profiles comprising information related to at least one of a height, weight, or posture of the occupant,
wherein the one or more first signals are compared to a plurality of sets of threshold values, wherein an individual set of threshold values is associated with an individual occupant profile, and
wherein the received first signals form a measured capacitance profile which is analyzed via machine learning to determine a most probable state of seatbelt usage.

8. The system of claim 5 wherein the controller is further configured to characterize operation of the vehicle based on the analysis of the received one or more first signals.

9. The system of claim 7 wherein the controller is further configured to determine a proper use of the seat based on the identified individual occupant profile.

10. The system of claim 7 wherein the sensor module comprises a capacitance sensor.

11. The system of claim 10 wherein the controller is further configured to:
compare a measured capacitance with a threshold value included in a set of threshold values; and
determine improper usage of a belt by the occupant if the measured capacitance exceeds the threshold value.

12. The system of claim 7 wherein the at least one parameter associated with the seat is indicative of an occupants weight.

13. The system of claim 7 wherein the at least one parameter associated with the seat is indicative of an occupants height.

14. The system of claim 7, wherein the controller further analyzes an orientation profile based on an inertial sensor integrated with the seat.

15. A method for identifying an individual occupant profile, the method comprising:
storing a plurality of occupant profiles, the plurality of occupant profiles comprising information related to a height, weight, or posture of the occupant;
generating one or more first signals indicative of a least on parameter associated with a vehicle seat;
receiving one or more first signals indicative of the at least one parameter,
analyzing the received one or more signals, wherein the one or more first signals are compared to a plurality of sets of threshold values, wherein an individual set of threshold values is associated with an individual occupant profile;
matching an occupant to an individual occupant profile of the plurality of occupant profiles based on the analysis of the received one or more signals; and
characterizing operation of the vehicle based on the individual occupant profile;
wherein the received first signals form a measured capacitance profile which is analyzed via machine learning to determine a most probable state of seatbelt usage.

16. The method of claim 15 further comprising determining a proper use of a vehicle seat based on the individual occupant profile.

17. The method of claim 13, wherein analyzing the received one or more signals comprises comparing an individual set of threshold values and the one or more signals.

18. The method of claim 15, wherein analyzing further comprises analyzing an orientation profile based on an inertial sensor integrated with the vehicle seat.

* * * * *